(12) United States Patent
Lee

(10) Patent No.: US 11,449,277 B2
(45) Date of Patent: Sep. 20, 2022

(54) MEMORY CONTROLLER AND METHOD OF OPERATING THE SAME

(71) Applicant: SK hynix Inc., Gyeonggi-do (KR)

(72) Inventor: Seok Jun Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 155 days.

(21) Appl. No.: 16/937,167

(22) Filed: Jul. 23, 2020

(65) Prior Publication Data
US 2021/0247932 A1 Aug. 12, 2021

(30) Foreign Application Priority Data
Feb. 11, 2020 (KR) .................. 10-2020-0016610

(51) Int. Cl.
*G06F 3/06* (2006.01)
(52) U.S. Cl.
CPC ............ *G06F 3/0659* (2013.01); *G06F 3/064* (2013.01); *G06F 3/0611* (2013.01); *G06F 3/0673* (2013.01)
(58) Field of Classification Search
None
See application file for complete search history.

(56) References Cited

U.S. PATENT DOCUMENTS

| | | | | |
|---|---|---|---|---|
| 2012/0036309 | A1* | 2/2012 | Dillow | G06F 11/108 |
| | | | | 711/E12.008 |
| 2014/0032817 | A1* | 1/2014 | Bux | G06F 12/0261 |
| | | | | 711/E12.008 |
| 2014/0047169 | A1* | 2/2014 | Seo | G06F 12/023 |
| | | | | 711/103 |
| 2014/0185376 | A1* | 7/2014 | Sinclair | G06F 3/0658 |
| | | | | 365/185.03 |
| 2018/0275922 | A1* | 9/2018 | Nemazie | G06F 3/0679 |
| 2019/0065367 | A1* | 2/2019 | Li | G06F 12/0891 |

FOREIGN PATENT DOCUMENTS

| | | |
|---|---|---|
| KR | 10-2017-0015708 | 2/2017 |
| KR | 10-2017-0042985 | 4/2017 |

* cited by examiner

*Primary Examiner* — Michael Alsip
(74) *Attorney, Agent, or Firm* — IP & T Group LLP

(57) ABSTRACT

Provided herein is a memory controller and a method of operating the same. A memory controller for controlling a memory device including a plurality of memory blocks may include a workload determiner and a write controller. The workload determiner is configured to set a threshold number of free blocks for determining whether a number of free blocks, among the plurality of memory blocks, falls within a normal range based on a predicted idle period of the memory device, and to determine a workload pattern of the memory device by comparing the number of free blocks with the threshold number of free blocks. The write controller is configured to control the memory device so that one of a fast write operation and a normal write operation is selectively performed depending on the workload pattern.

20 Claims, 15 Drawing Sheets

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2020-0016610, filed on Feb. 11, 2020, which is incorporated herein by reference in its entirety.

BACKGROUND

Field of Invention

Various embodiments of the present disclosure generally relate to an electronic device, and more particularly, to a memory controller and a method of operating the memory controller.

Description of Related Art

A storage device is a device which stores data under the control of a host device such as a computer or a smartphone. The storage device may include a memory device in which data is stored and a memory controller which controls the memory device. Memory devices are classified into a volatile memory device and a nonvolatile memory device.

The volatile memory device is a memory device in which data is stored only when power is supplied and in which stored data is lost when the supply of power is interrupted. Examples of the volatile memory device may include a Static Random Access Memory (SRAM) and a Dynamic Random Access Memory (DRAM).

The nonvolatile memory device is a memory device in which stored data is retained even when the supply of power is interrupted, and examples thereof include a Read Only Memory (ROM), a Programmable ROM (PROM), an Electrically Programmable ROM (EPROM), an Electrically Erasable and Programmable ROM (EEPROM), and a flash memory.

SUMMARY

Various embodiments of the present disclosure are directed to a memory controller having improved write performance and a method of operating the memory controller.

An embodiment of the present disclosure may provide for a memory controller for controlling a memory device including a plurality of memory blocks. The memory controller may include a workload determiner and a write controller. The workload determiner may be configured to set a threshold number of free blocks for determining whether a number of free blocks, among the plurality of memory blocks, falls within a normal range based on a predicted idle period of the memory device, and to determine a workload pattern of the memory device by comparing the number of free blocks with the threshold number of free blocks. The write controller may be configured to control the memory device so that one of a fast write operation and a normal write operation is selectively performed depending on the workload pattern.

An embodiment of the present disclosure may provide for a method of operating a memory controller, the memory controller controlling a memory device including a plurality of memory blocks. The method may include determining a predicted idle period of the memory device based on representative idle periods corresponding to respective open blocks, among the plurality of memory blocks, setting a threshold number of free blocks based on the predicted idle period, and controlling the memory device so that any one of a fast write operation and a normal write operation is selectively performed based on a result of a comparison between the threshold number of free blocks and a number of free blocks, among the plurality of memory blocks.

An embodiment of the present disclosure may provide for an operating method of a memory controller. The operating method may include determining a threshold number of free blocks within a buffer area based on one or a combination of two or more among a history of idle periods of open blocks within the buffer area, time required to erase a block and a minimum number of free blocks for a dirty state of a memory device, and controlling the memory device to perform one of a fast write operation on the buffer area and a normal write operation on a main area based on a number of free blocks within the buffer area and the threshold number.

DETAILED DESCRIPTION

Hereinafter, embodiments of the present disclosure will be described in detail with reference to the attached drawings.

Figure 1:
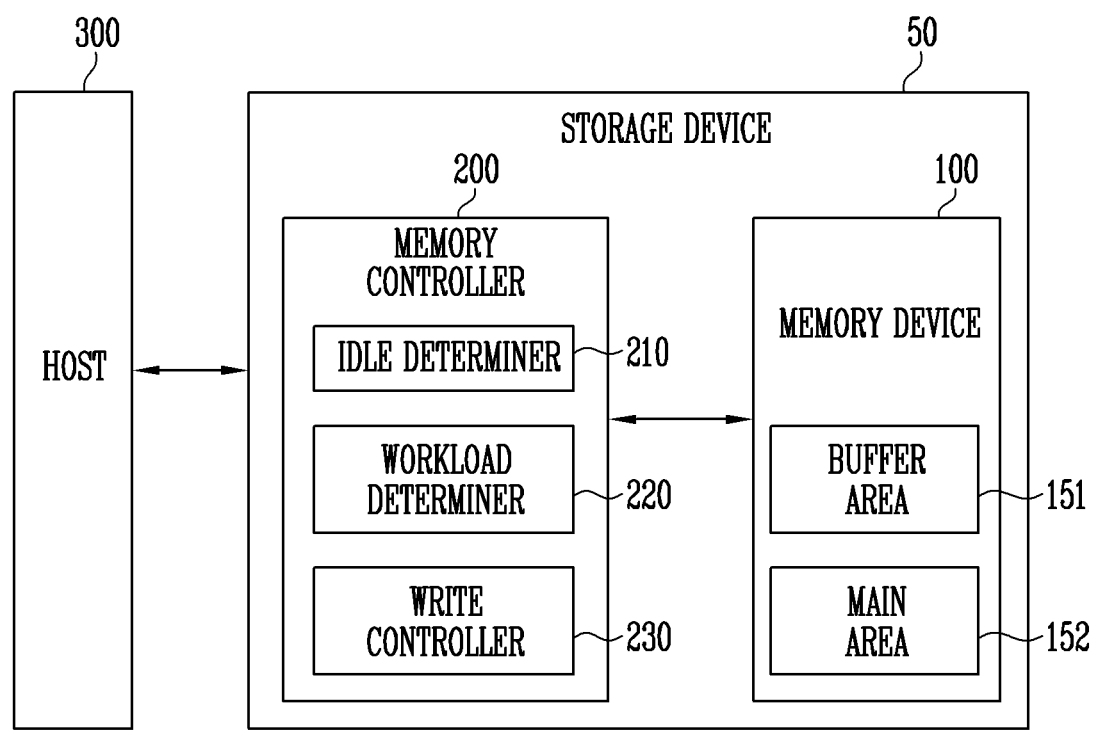
FIG. 1 is a diagram illustrating a storage device according to an embodiment of the present disclosure.

FIG. 1 is a diagram illustrating a storage device according to an embodiment of the present disclosure.

Referring to FIG. 1, a storage device 50 may include memory devices 100 and a memory controller 200. The storage device 50 may be a device which stores data under the control of a host 300, such as a mobile phone, a smartphone, an MP3 player, a laptop computer, a desktop computer, a game console, a television (TV), a tablet personal computer (PC), or an in-vehicle infotainment system.

The storage device 50 may be manufactured as any one of various types of storage devices depending on a host interface that is a scheme for communication with the host 300. The storage device 50 may be implemented as any one of various types of storage devices, for example, a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal storage bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

Each memory device 100 may store data. The memory device 100 is operated in response to the control of the memory controller 200. The memory device 100 may include a memory cell array including a plurality of memory cells which store data.

Each of the memory cells may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

The memory cell array may include a plurality of memory blocks. Each memory block may include a plurality of memory cells. One memory block may include a plurality of pages. In an embodiment, each page may be a unit by which data is stored in the memory device 100 or by which data stored in the memory device 100 is read.

In an embodiment, the memory device 100 may include a buffer area 151 and a main area 152. The buffer area 151 may include buffer blocks. The main area 152 may include main blocks.

Each buffer block may include memory cells which store n bits, where n is a natural number of 1 or more. Each main block may include memory cells which store m bits, where m is a natural number equal to or greater than n.

Since the number of bits stored in the memory cells of each buffer block is less than or equal to the number of bits stored in the memory cells of each main block, a write operation on the buffer block may be performed faster than a write operation on the main block. Therefore, the write operation of storing data in the buffer block may be a fast write operation. The write operation of storing data in the main block may be a normal write operation.

A memory block may be a unit by which data is erased. In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM). In the present specification, for convenience of description, the memory device 100 is a NAND flash memory however other forms of memory devices may be used.

The memory device 100 may receive a command and an address from the memory controller 200, and may access the area of the memory cell array, selected by the address. That is, the memory device 100 may perform an operation indicated by the command on the area selected by the address. For example, the memory device 100 may perform a write operation (i.e., program operation), a read operation, and an erase operation. During a program operation, the memory device 100 may program data to the area selected by the address. During a read operation, the memory device 100 may read data from the area selected by the address. During an erase operation, the memory device 100 may erase data stored in the area selected by the address.

The memory controller 200 controls the overall operation of the storage device 50.

When power is applied to the storage device 50, the memory controller 200 may run firmware (FW). When the memory device 100 is a flash memory device, the memory controller 200 may run firmware such as a flash translation layer (FTL) for controlling communication between the host 300 and the memory device 100.

In an embodiment, the memory controller 200 may receive data and a logical block address (LBA) from the host 300, and may translate the logical block address into a physical block address (PBA) indicating the address of memory cells which are included in the memory device 100 and in which data is to be stored.

The memory controller 200 may control the memory device 100 so that a program operation, a read operation or an erase operation is performed in response to a request received from the host 300. During a program operation, the memory controller 200 may provide a write command, a physical block address, and data to the memory device 100. During a read operation, the memory controller 200 may provide a read command and a physical block address to the memory device 100. During an erase operation, the memory controller 200 may provide an erase command and a physical block address to the memory device 100.

In an embodiment, the memory controller 200 may autonomously generate a command, an address, and data regardless of a request from the host 300, and may transmit them to the memory device 100. For example, the memory controller 200 may provide commands, addresses, and data to the memory device 100 to perform background operations, such as a program operation for wear leveling and a program operation for garbage collection.

In an embodiment, the memory controller 200 may control at least two memory devices 100. In this case, the memory controller 200 may control the memory devices 100 depending on an interleaving scheme to improve operating performance. The interleaving scheme may be an operating manner in which the operating periods of the at least two memory devices 100 are caused to overlap each other.

In an embodiment, the memory controller 200 may include a workload determiner 220 and a write controller 230. The memory controller 200 may further include an idle determiner 210. The workload determiner 220 and the idle determiner 210 include all circuits, systems, software, firmware and devices necessary for their respective operations and functions.

The idle determiner 210 may predict an idle period of the memory device 100. The idle period may indicate a state in which an operation corresponding to the request from the host 300 is not performed. The memory device 100 may perform a background operation under the control of the memory controller 200 during the idle period.

The idle determiner 210 may predict the idle period of the memory device 100 based on block idle periods for each open block among the plurality of memory blocks included in the memory device 100. The block idle periods may be periods during which a data write operation on the corresponding open block is not performed. The block idle periods will be described in detail later with reference to FIG. 5.

In an embodiment, the open blocks may be open blocks included in the buffer blocks within the buffer area 151. In an embodiment, the open blocks may be open blocks included in the main blocks within the main area 152. In an embodiment, the open blocks may be open blocks included in the buffer blocks within the buffer area 151 and open blocks included in the main blocks within the main area 152.

The workload determiner 220 may set the threshold number of free blocks depending on the idle period predicted by the idle determiner 210. In various embodiments, the workload determiner 220 may acquire information of a predicted idle period of the memory device 100 from the host 300.

The threshold number of free blocks may be for determining whether the number of free blocks among the plurality of memory blocks included in the memory device 100 falls within a normal range. In an embodiment, the number of free blocks may be the number of free blocks included in the buffer blocks within the buffer area 151.

The workload determiner 220 may determine a workload pattern based on the result of a comparison between the number of free blocks and the threshold number of free blocks.

For example, when the number of free blocks is equal to or greater than the threshold number of free blocks, the number of free blocks may fall within a normal range, and the workload pattern may be a first workload pattern. When the number of free blocks is less than the threshold number of free blocks, the number of free blocks may fall out of the normal range, and the workload pattern may be a second workload pattern.

The write controller 230 may control the memory device 100 so that the memory device 100 selectively performs any one of a fast write operation or a normal write operation depending on the workload pattern. The fast write operation may be an operation of storing data in the buffer area 151. The normal write operation may be an operation of storing data in the main area 152. When the fast write operation is performed, the number of free blocks in the buffer blocks within the buffer area 151 may be decreased.

When the workload pattern is the first workload pattern, the number of free blocks falls within the normal range, and thus the write controller 230 may control the memory device 100 so that the fast write operation is performed. When the workload pattern is the second workload pattern, the number of free blocks falls out of the normal range, and thus the write controller 230 may control the memory device 100 so that the normal write operation is performed.

In accordance with an embodiment of the present disclosure, the memory controller 200 may set the threshold number of free blocks based on the number of free blocks secured through a background erase operation to be performed during the predicted idle period of the memory device 100. The memory controller 200 may determine whether the number of free blocks is sufficient or insufficient by comparing the number of free blocks within the memory device 100 with the threshold number of free blocks.

The memory controller 200 may control the memory device 100 so that, when the number of free blocks is sufficient, the fast write operation is performed, whereas when the number of free blocks is insufficient, the normal write operation is performed. In this way, the memory controller 200 may prevent the memory device 100 from entering a dirty state in which a garbage collection operation is required due to the insufficiency of the number of free blocks.

Also, the memory controller 200 may take into consideration the number of free blocks secured through the background erase operation to be performed during the predicted idle period of the memory device 100, thus maximizing the efficiency of the fast write operation. That is, the memory controller 200 may increase the period during which the fast write operation is performed, compared to a case where the number of free blocks secured through the background erase operation is not taken into consideration.

The host 300 may communicate with the storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

Figure 2:
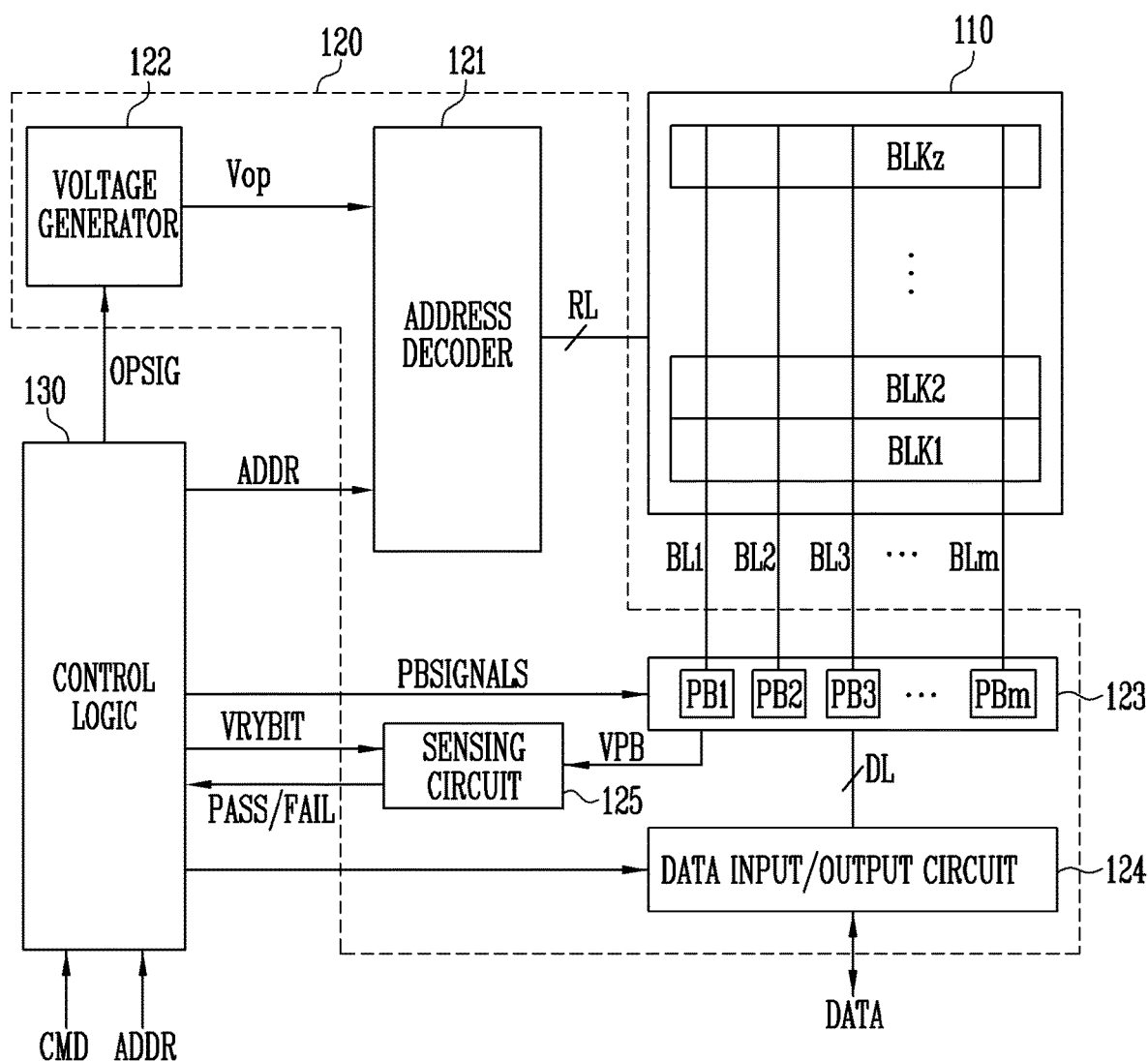
FIG. 2 is a diagram illustrating the structure of a memory device of FIG. 1.

FIG. 2 is a diagram illustrating the structure of the memory device of FIG. 1.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are coupled to an address decoder 121 through row lines RL. The memory blocks BLK1 to BLKz are coupled to a read and write circuit 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line, among the plurality of memory cells, are defined as one physical page. In other words, the memory cell array 110 may include a plurality of physical pages. In an embodiment of the present disclosure, each of the memory blocks BLK1 to BLKz included in the memory cell array 110 may include a plurality of dummy cells. For the dummy cells, one or more dummy cells may be coupled in series between a drain select transistor and memory cells, and between a source select transistor and memory cells.

Each of the memory cells of the memory device 100 may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

The peripheral circuit 120 may include the address decoder 121, a voltage generator 122, the read and write circuit 123, a data input/output circuit 124, and a sensing circuit 125.

The peripheral circuit 120 may drive the memory cell array 110. For example, the peripheral circuit 120 may drive the memory cell array 110 to perform a program operation, a read operation, and an erase operation.

The address decoder 121 is coupled to the memory cell array 110 through the row lines RL. The row lines RL may include drain select lines, word lines, source selection lines, and a common source line. In accordance with an embodiment of the present disclosure, the word lines may include normal word lines and dummy word lines. In accordance with an embodiment of the present disclosure, the row lines RL may further include a pipe select line.

The address decoder 121 may be operated under the control of the control logic 130. The address decoder 121 receives addresses ADDR from the control logic 130.

The address decoder 121 may decode a block address, among the received addresses ADDR. The address decoder 121 selects at least one of the memory blocks BLK1 to BLKz according to the decoded block address. The address decoder 121 may decode a row address among the received addresses ADDR. The address decoder 121 may select at least one of word lines of the selected memory block according to the decoded row address. The address decoder 121 may apply an operating voltage Vop supplied from the voltage generator 122 to the selected word line.

During a program operation, the address decoder 121 may apply a program voltage to the selected word line and apply a pass voltage having a level lower than that of the program voltage to unselected word lines. During a program verify operation, the address decoder 121 may apply a verify voltage to the selected word line and apply a verify pass voltage having a level higher than that of the verify voltage to the unselected word lines.

During a read operation, the address decoder 121 may apply a read voltage to the selected word line and apply a read pass voltage having a level higher than that of the read voltage to the unselected word lines.

In accordance with an embodiment of the present disclosure, an erase operation of the memory device 100 is performed on a memory block basis. During an erase operation, the addresses ADDR input to the memory device 100 include a block address. The address decoder 121 may decode the block address and select at least one memory block according to the decoded block address. During the erase operation, the address decoder 121 may apply a ground voltage to word lines coupled to the selected memory block.

In accordance with an embodiment of the present disclosure, the address decoder 121 may decode a column address, among the received addresses ADDR. The decoded column address may be transferred to the read and write circuit 123. In an embodiment, the address decoder 121 may include components, such as a row decoder, a column decoder, and an address buffer.

The voltage generator 122 may generate a plurality of operating voltages Vop using an external supply voltage that is supplied to the memory device 100. The voltage generator 122 may be operated under the control of the control logic 130.

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate the plurality of operating voltages Vop using the external supply voltage or the internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include a plurality of pumping capacitors for receiving the internal supply voltage so as to generate a plurality of operating voltages Vop having various voltage levels, and may generate the plurality of operating voltages Vop by selectively enabling the plurality of pumping capacitors under the control of the control logic 130.

The generated operating voltages Vop may be supplied to the memory cell array 110 by the address decoder 121.

The read and write circuit 123 includes first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm are operated under the control of the control logic 130.

The first to m-th page buffers PB1 to PBm perform data communication with the data input/output circuit 124. During a program operation, the first to m-th page buffers PB1 to PBm receive data DATA to be stored through the data input/output circuit 124 and data lines DL.

During a program operation, the first to m-th page buffers PB1 to PBm may transfer the data DATA to be stored, received through the data input/output circuit 124, to selected memory cells through the bit lines BL1 to BLm when a program voltage is applied to a selected word line. Memory cells in a selected page are programmed based on the received data DATA. Memory cells coupled to a bit line to which a program permission voltage (e.g., a ground voltage) is applied may have increased threshold voltages. The threshold voltages of memory cells coupled to a bit line to which a program inhibit voltage (e.g., a supply voltage) is applied may be maintained. During a program verify operation, the first to m-th page buffers PB1 to PBm read the data DATA stored in the selected memory cells from the selected memory cells through the bit lines BL1 to BLm.

During a read operation, the read and write circuit 123 may read data DATA from the memory cells in the selected page through the bit lines BL, and may store the read data DATA in the first to m-th page buffers PB1 to PBm.

During an erase operation, the read and write circuit 123 may allow the bit lines BL to float. In an embodiment, the read and write circuit 123 may include a column select circuit.

The data input/output circuit 124 is coupled to the first to m-th page buffers PB1 to PBm through the data lines DL. The data input/output circuit 124 is operated in response to the control of the control logic 130.

The data input/output circuit 124 may include a plurality of input/output buffers (not illustrated) which receive input data DATA. During a program operation, the data input/ output circuit 124 receives the data DATA to be stored from an external controller (not illustrated). During a read operation, the data input/output circuit 124 outputs the data DATA, received from the first to m-th page buffers PB1 to PBm included in the read and write circuit 123, to the external controller.

During a read operation or a verify operation, the sensing circuit 125 may generate a reference current in response to an enable bit signal VRYBIT generated by the control logic 130, and may output a pass signal or a fail signal to the control logic 130 by comparing a sensing voltage VPB received from the read and write circuit 123 with a reference voltage generated by the reference current.

The control logic 130 may be coupled to the address decoder 121, the voltage generator 122, the read and write circuit 123, the data input/output circuit 124, and the sensing circuit 125. The control logic 130 may control the overall operation of the memory device 100. The control logic 130 may be operated in response to a command CMD transmitted from an external device.

The control logic 130 may control the peripheral circuit 120 by generating various types of signals in response to the command CMD and the addresses ADDR. For example, the control logic 130 may generate an operation signal OPSIG, an address ADDR, read and write circuit control signals PBSIGNALS, and the enable bit VRYBIT in response to the command CMD and the addresses ADDR. The control logic 130 may output the operation signal OPSIG to the voltage generator 122, output the address ADDR to the address decoder 121, output the page buffer control signal PBSIGNALS to the read and write circuit 123, and output the enable bit VRYBIT to the sensing circuit 125. In addition, the control logic 130 may determine whether a verify operation has passed or failed in response to the pass or fail signal PASS or FAIL output from the sensing circuit 125.

Figure 3:
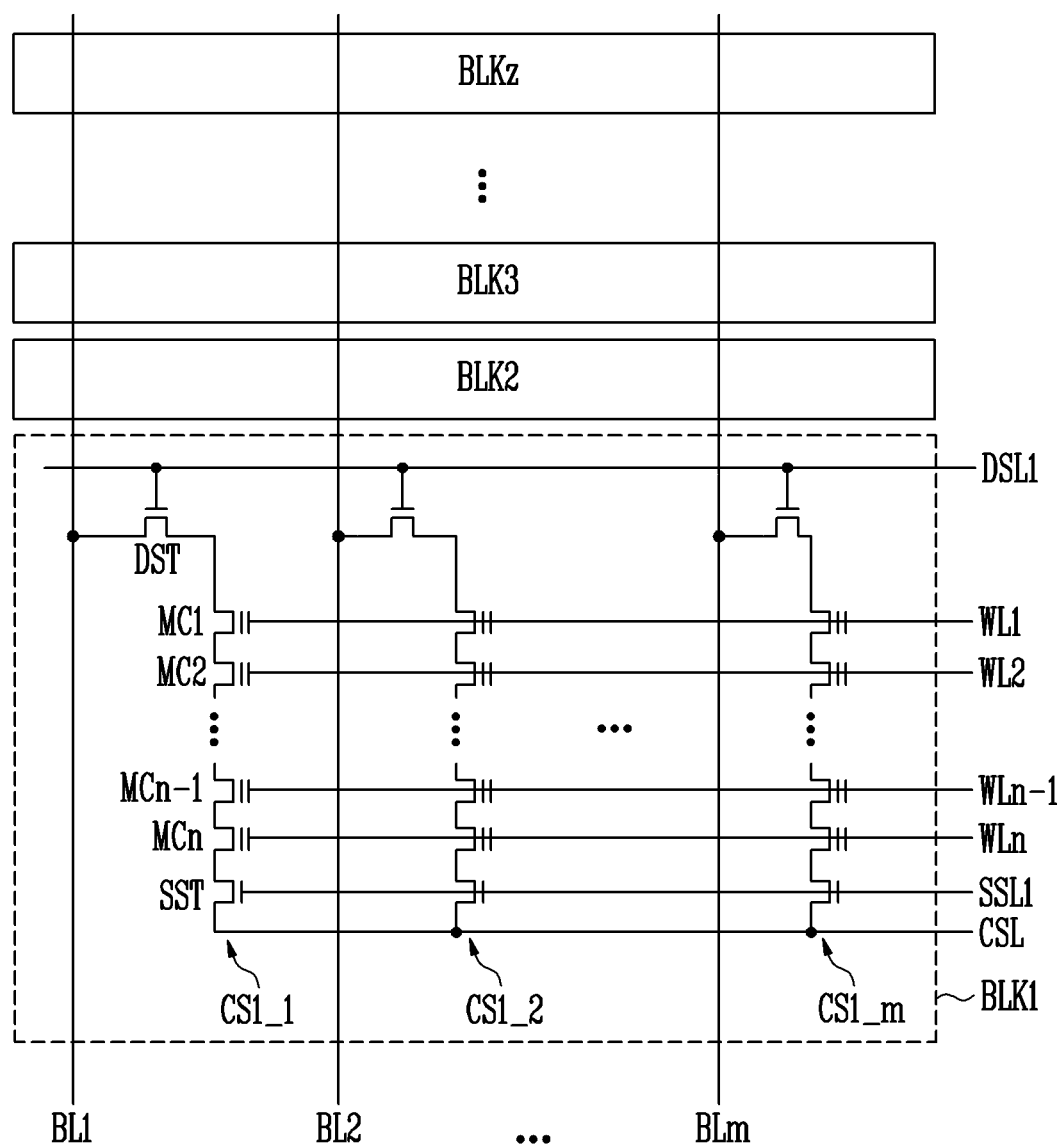
FIG. 3 is a diagram illustrating a memory cell array of FIG. 2.

FIG. 3 is a diagram illustrating the memory cell array of FIG. 2.

Referring to FIG. 3, the first to z-th memory blocks BLK1 to BLKz are coupled in common to the first to m-th bit lines BL1 to BLm. In FIG. 3, for convenience of description, elements included in the first memory block BLK1, among the plurality of memory blocks BLK1 to BLKz, are illustrated, and illustration of elements included in each of the remaining memory blocks BLK2 to BLKz is omitted. It will be understood that each of the remaining memory blocks BLK2 to BLKz has the same configuration as the first memory block BLK1.

The memory block BLK1 may include a plurality of cell strings CS1_1 to CS1_m, where m is a positive integer. The first to m-th cell strings CS1_1 to CS1_m are respectively coupled to the first to m-th bit lines BL1 to BLm. Each of the first to m-th cell strings CS1_1 to CS1_m may include a drain select transistor DST, a plurality of memory cells MC1 to MCn, where n is a positive integer, which are coupled in series to each other, and a source select transistor SST.

A gate terminal of the drain select transistor DST included in each of the first to m-th cell strings CS1_1 to CS1_m is coupled to a drain select line DSL1. Gate terminals of the first to n-th memory cells MC1 to MCn included in each of the first to m-th cell strings CS1_1 to CS1_m are coupled to first to n-th word lines WL1 to WLn, respectively. A gate terminal of the source select transistor SST included in each of the first to m-th cell strings CS1_1 to CS1_m is coupled to a source select line SSL1.

For convenience of description, the structure of each cell string will be described based on the first cell string CS1_1, among the plurality of cell strings CS1_1 to CS1_m. However, it will be understood that each of the remaining cell strings CS1_2 to CS1_m is configured in the same manner as the first cell string CS1_1.

A drain terminal of the drain select transistor DST included in the first cell string CS1_1 is coupled to the first bit line BL1. A source terminal of the drain select transistor DST included in the first cell string CS1_1 is coupled to a drain terminal of the first memory cell MC1 included in the first cell string CS1_1. The first to n-th memory cells MC1 to MCn may be coupled in series to each other. A drain terminal of the source select transistor SST included in the first cell string CS1_1 is coupled to a source terminal of the n-th memory cell MCn included in the first cell string CS1_1. A source terminal of the source select transistor SST included in the first cell string CS1_1 is coupled to a common source line CSL. In an embodiment, the common source line CSL may be coupled in common to the first to z-th memory blocks BLK1 to BLKz.

The drain select line DSL1, the first to n-th word lines WL1 to WLn, and the source select line SSL1 are included in the row lines RL of FIG. 2. The drain select line DSL1, the first to n-th word lines WL1 to WLn, and the source select line SSL1 are controlled by the address decoder 121. The common source line CSL is controlled by the control logic 130. The first to m-th bit lines BL1 to BLm are controlled by the read and write circuit 123.

Figure 4:
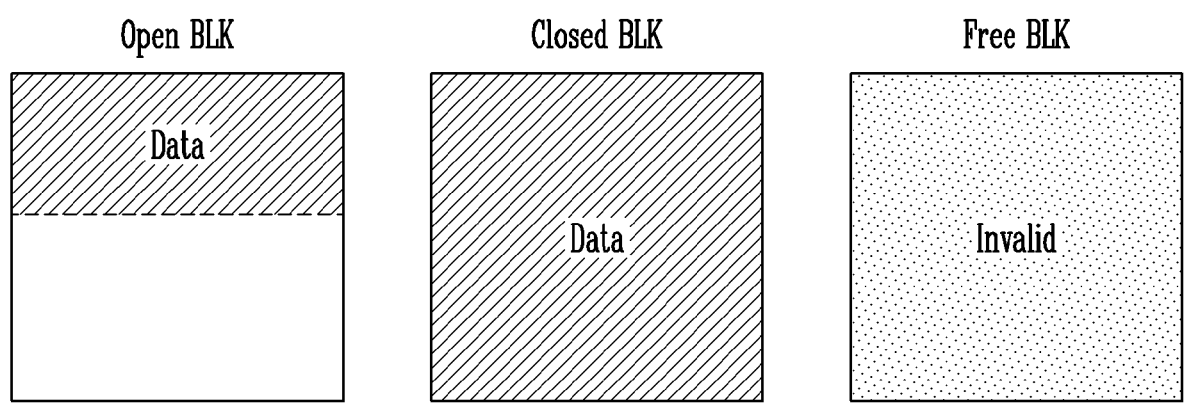
FIG. 4 is a diagram illustrating an open block according to an embodiment of the present disclosure.

FIG. 4 is a diagram illustrating an open block according to an embodiment of the present disclosure.

Referring to FIG. 4, memory blocks may be classified into a data block and a free block.

Data stored in the data block may include valid data. The data stored in the data block may include invalid data. The data block may include an open block and a closed block.

The open block may be in a state in which valid data is written to a partial storage area of a corresponding memory block. The closed block may be in a state in which writing of valid data to the entire storage area of the corresponding memory block is completed.

The data stored in the free block may be invalid data. The free block may be in a state in which invalid data is written to the storage area of a corresponding memory block. The free block may be assigned as a data block which stores data after being erased.

Figure 5:
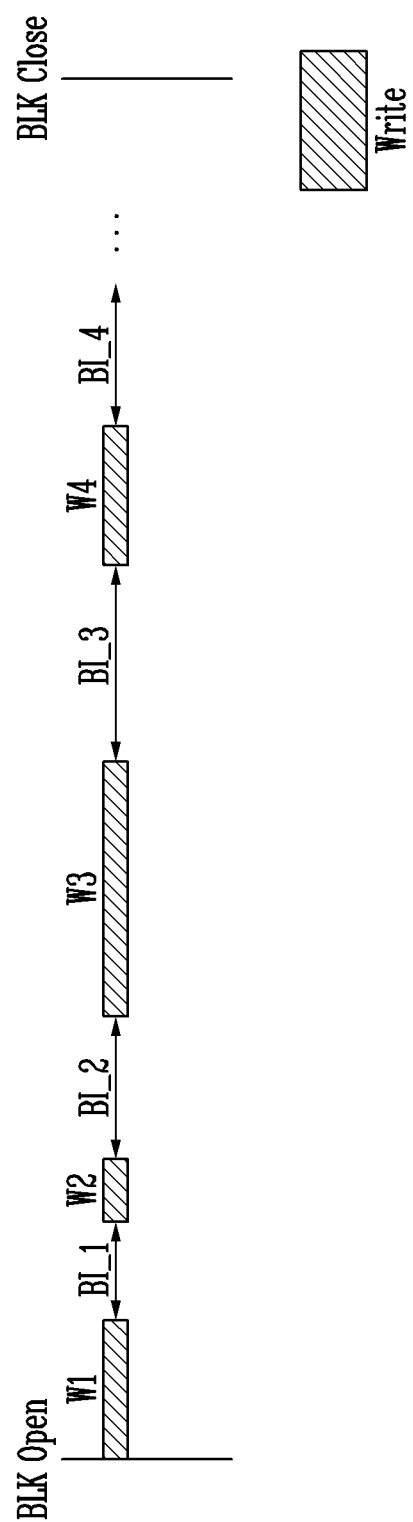
FIG. 5 is a diagram illustrating block idle periods according to an embodiment of the present disclosure.

FIG. 5 is a diagram illustrating block idle periods according to an embodiment of the present disclosure.

Referring to FIG. 5, an open time point of a memory block may be a time point at which writing of data to the memory block is initiated. The open time point may be a time point at which a memory block is assigned as a data block so as to store data. The memory block in which data writing is initiated may be an open block.

A close time point of the memory block may be a time point at which the writing of data to the memory block is completed. The memory block in which data writing is completed may be a closed block.

In an embodiment, block idle periods BI may be periods during which a data write operation is not performed on the corresponding memory block. For example, an idle period between a period W1 during which a first write operation is performed on the memory block, and a period W2 during which a second write operation is performed on the memory block may be a first block idle period BI_1. An idle period between the period W2 during which the second write operation is performed, and a period W3 during which a third write operation is performed may be a second block idle period BI_2. In a similar way, the block idle periods may be recorded up to a time point at which the memory block is closed.

Figure 6:
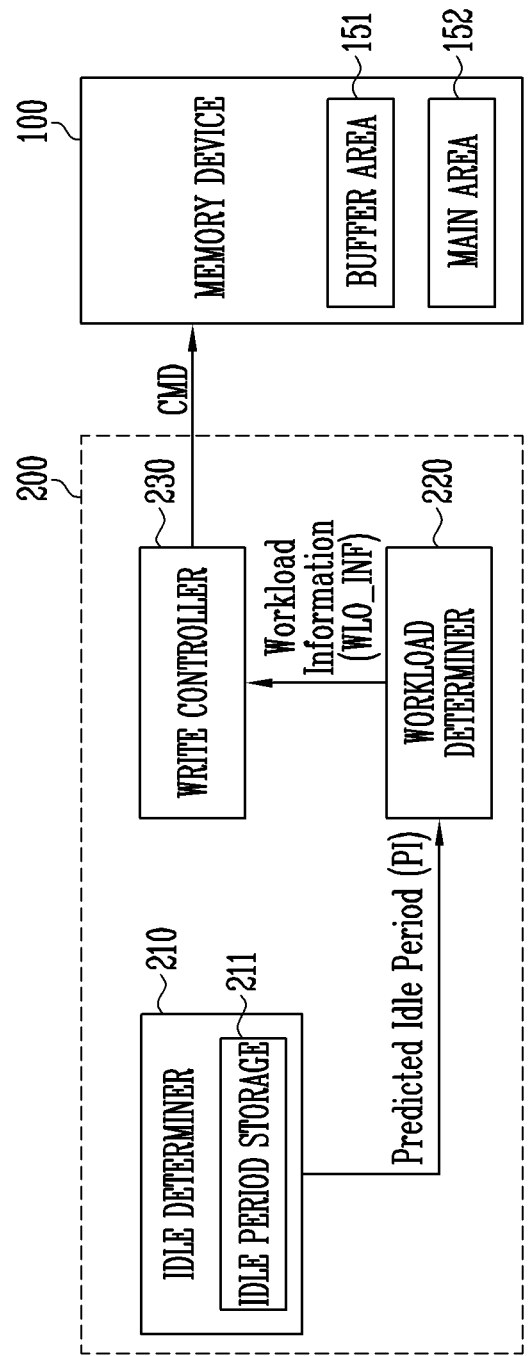
FIG. 6 is a diagram illustrating the configuration and operation of a memory controller of FIG. 1.

FIG. 6 is a diagram illustrating the configuration and operation of the memory controller of FIG. 1.

Referring to FIG. 6, the memory device 100 may include a buffer area 151 and a main area 152. The buffer area 151 may include buffer blocks. The main area 152 may include main blocks.

In an embodiment, each buffer block may include memory cells which store n bits, where n is a natural number of 1 or more. Each main block may include memory cells which store m bits, where m is a natural number equal to or greater than n. Therefore, a write operation of storing data in the buffer area 151 may be a fast write operation. A write operation of storing data in the main area 152 may be a normal write operation.

The memory controller 200 may include an idle determiner 210, a workload determiner 220, and a write controller 230.

The idle determiner 210 may include an idle period storage 211.

The idle period storage 211 may store information of block idle periods for open blocks among a plurality of memory blocks included in the memory device 100. In an embodiment, the idle period storage 211 may store, for each open block, information of one or more block idle periods after the open time point of the corresponding memory block. In an embodiment, the idle period storage 211 may store, for each open block, information of a set number of block idle periods including a recent block idle period.

The idle determiner 210 may predict an idle period of the memory device 100 based on the information of the block idle periods for respective open blocks, which are stored in the idle period storage 211.

In detail, the idle determiner 210 may determine a representative idle period of each open block based on one or more block idle periods corresponding to the open block. The idle determiner 210 may determine the predicted idle period PI of the memory device 100 based on representative idle periods respectively corresponding to one or more open blocks.

In an embodiment, the idle determiner 210 may determine a predicted idle period PI whenever an open block is closed. In various embodiments, the idle determiner 210 may determine the predicted idle period PI at regular cycles. A time point at which the idle determiner 210 determines the predicted idle period PI is not limited to the present embodiment. The determination of the predicted idle period PI will be described in detail later with reference to FIGS. 8 and 9.

The idle determiner 210 may provide information of the predicted idle period PI to the workload determiner 220.

The workload determiner 220 may set the threshold number of free blocks depending on the predicted idle period PI. In various embodiments, the workload determiner 220 may acquire information of the predicted idle period (not illustrated) of the memory device 100 from a host 300.

In detail, the workload determiner 220 may set the threshold number of free blocks based on the result of a comparison between the predicted idle period PI and a reference erase time, and the minimum number of free blocks.

The reference erase time may be time required to erase a set number of free blocks. In an embodiment, the reference erase time may be the time required to erase one memory block. The set number is not limited to the present embodiment. The minimum number of free blocks may be the number of free blocks at which the memory device 100 is expected to enter a dirty state in which a garbage collection operation is required. The threshold number of free blocks may be for determining whether the number of free blocks falls within a normal range. In an embodiment, the free blocks may be included in the buffer blocks within the buffer area 151 of the memory device 100.

The workload determiner 220 may adjust the threshold number of free blocks based on the result of the comparison between the predicted idle period PI and the reference erase time. A lowest value of the threshold number of free blocks to be adjusted may be limited to the minimum number of free blocks. When the predicted idle period PI is equal to or longer than the reference erase time, the workload determiner 220 may predict that a set number of free blocks will be secured during the predicted idle period PI of the memory device 100. Therefore, the workload determiner 220 may loosen the condition in which a fast write operation is limited by maintaining or decreasing the threshold number of free blocks.

When the predicted idle period PI is shorter than the reference erase time, the workload determiner 220 may predict that a set number of free blocks will not be secured during the predicted idle period PI of the memory device 100. Therefore, the workload determiner 220 may tighten the condition in which a fast write operation is limited by increasing the threshold number of free blocks.

The workload determiner 220 may determine the workload pattern of the memory device 100 based on the result of a comparison between the number of free blocks and the threshold number of free blocks.

For example, when the number of free blocks is equal to or greater than the threshold number of free blocks, the number of free blocks may fall within a normal range, and the workload pattern may be a first workload pattern. When the number of free blocks is less than the threshold number of free blocks, the number of free blocks may fall out of the normal range, and the workload pattern may be a second workload pattern.

A workload information generator (not illustrated) of the workload determiner 220 may generate workload information WLO_INF indicating the workload pattern of the memory device based on the result of the comparison between the number of free blocks FB # and the threshold number of free blocks FB_TH.

For example, when the number of free blocks FB # is equal to or greater than the threshold number of free blocks FB_TH, the number of free blocks FB # may fall within a normal range, and the workload pattern may be the first workload pattern. When the number of free blocks FB # is less than the threshold number of free blocks FB_TH, the number of free blocks FB # may fall out of the normal range, and the workload pattern may be the second workload pattern.

A free block information storage 224 (see FIG. 10) of the workload determiner 220 may store free block information indicating the number of free blocks FB #. The free block information storage 224 may provide the free block information to the workload information generator 223 (see FIG. 10). The free block information may be updated whenever a free block is assigned as a data block. In an embodiment, the number of free blocks FB # may be the number of free blocks within the buffer area 151.

Figure 7:
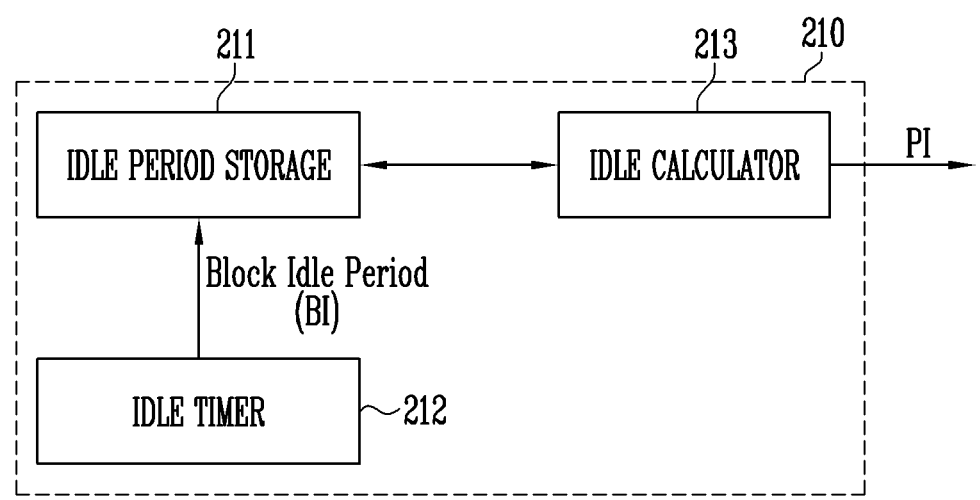
FIG. 7 is a diagram illustrating an idle determiner of FIG. 6 according to an embodiment of the present disclosure.

FIG. 7 is a diagram illustrating the idle determiner of FIG. 6 according to an embodiment.

Referring to FIG. 7, the idle determiner 210 may include an idle period storage 211 and an idle calculator 213. The idle determiner 210 may further include an idle timer 212.

The idle period storage 211 may store information of block idle periods for open blocks, as described above with reference to FIG. 6. In an embodiment, the idle period storage 211 may store information of block idle periods BI provided from the idle timer 212. In other embodiments, a write operation on a memory block is performed in response to a request from a host 300, described above with reference to FIG. 1, and thus the host 300 may determine block idle periods for the corresponding memory block. The idle period storage 211 may store information of block idle periods (not illustrated) provided from the host 300.

The idle timer 212 may measure the block idle periods BI for the open blocks and provide the information of the block idle periods BI to the idle period storage 211.

The idle calculator 213 may calculate a predicted idle period PI based on the information of the block idle periods BI for the open blocks, which are stored in the idle period storage 211.

In an embodiment, the idle calculator 213 may calculate the predicted idle period PI whenever an open block is closed. In various embodiments, the idle calculator 213 may calculate the predicted idle period PI at regular cycles. A time point at which the idle calculator 213 calculates the predicted idle period PI is not limited to the present embodiment.

In detail, the idle calculator 213 may calculate a representative idle period of one open block based on one or more block idle periods corresponding to the one open block. The idle calculator 213 may calculate the predicted idle period PI of the memory device 100 based on representative idle periods respectively corresponding to one or more open blocks. The calculation of the predicted idle period PI will be described in detail below with reference to FIGS. 8 and 9.

Figure 8:
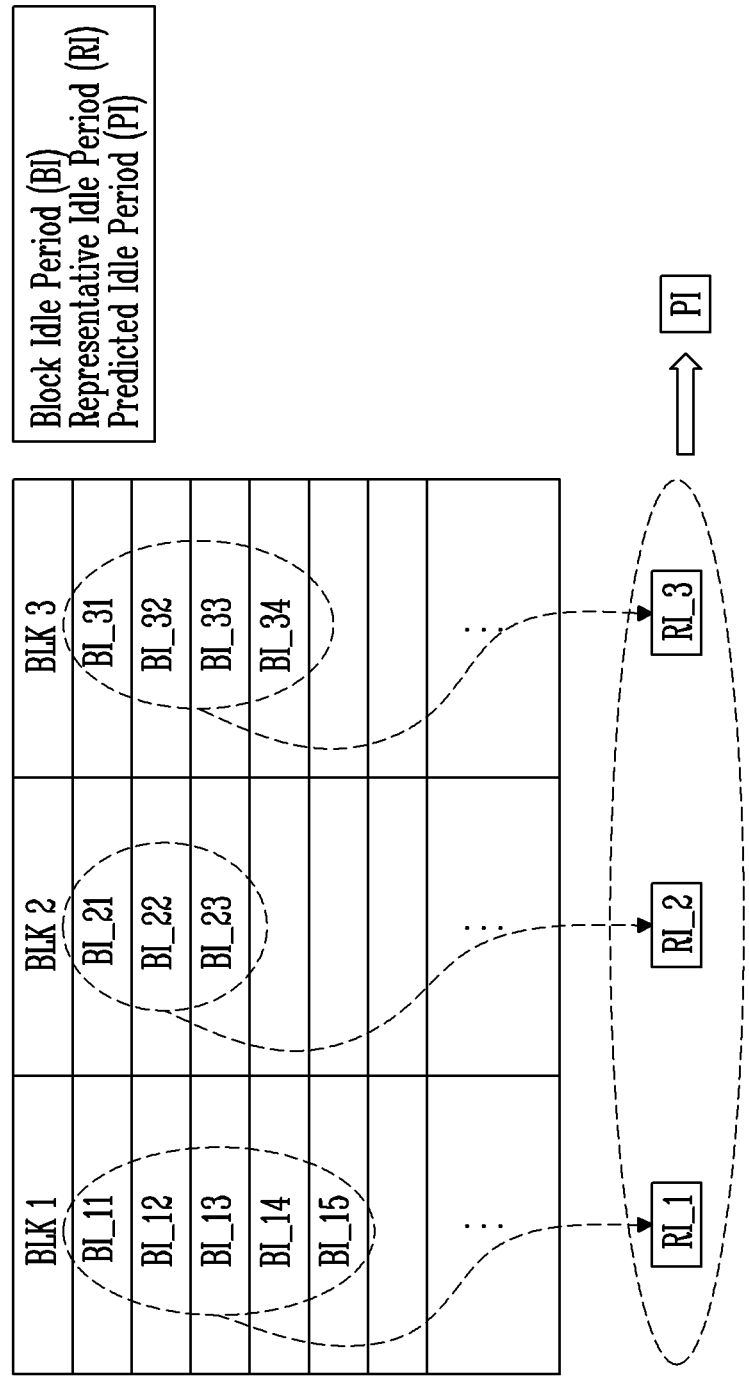
FIG. 8 is a diagram illustrating an idle period storage of FIG. 7 according to an embodiment of the present disclosure.

FIG. 8 is a diagram illustrating the idle period storage of FIG. 7 according to an embodiment.

Referring to FIG. 8, the idle period storage 211 may store, for each open block, information of one or more block idle periods after an open time point of the corresponding memory block.

For example, the idle period storage 211 may store information of block idle periods for open blocks BLK 1, BLK 2, and BLK 3.

In an embodiment, the open blocks BLK 1, BLK 2, and BLK 3 may be open blocks included in the buffer area 151. In an embodiment, the open blocks BLK 1, BLK 2, and BLK 3 may be open blocks included in the main area 152. In an embodiment, the open blocks BLK 1, BLK 2, and BLK 3 may be open blocks included in the buffer area 151 and open blocks included in the main area 152.

The idle period storage 211 may store information of block idle periods BI_11 to BI_15 for the first open block BLK 1. The idle period storage 211 may store information of block idle periods BI_21 to BI_23 for the second open block BLK 2. The idle period storage 211 may store information of block idle periods BI_31 to BI_34 for the third open block BLK 3.

A representative idle period of each open block may be determined based on one or more block idle periods for the corresponding open block. In an embodiment, the representative idle period may be determined based on any one of the minimum idle period, the intermediate idle period, the average idle period, and the maximum idle period of one or more block idle periods of a corresponding open block. For example, the representative idle period may be the average idle period that is the average value of the one or more block idle periods of a corresponding open block. In an embodiment, the representative idle period may be determined based on one or more block idle periods of a corresponding open block in which different weights are reflected depending on the sequence of the block idle periods of a corresponding open block. As a block idle period is a more recent block idle period, a higher weight may be reflected.

For example, a representative idle period RI_1 of the first open block BLK 1 may be determined based on the block idle periods BI_11 to BI_15 for the first open block BLK 1. The representative idle period RI_1 may be determined based on any one of the minimum idle period, the intermediate idle period, the average idle period, and the maximum idle period of the block idle periods BI_11 to BI_15 for the first open block BLK 1. For example, the representative idle period RI_1 may be the average idle period that is the average value of the block idle periods BI_11 to BI_15 for the first open block BLK 1.

In a similar way, a representative idle period RI_2 of the second open block BLK 2 may be determined based on the block idle periods BI_21 to BI_23 for the second open block BLK 2. A representative idle period RI_3 of the third open block BLK 3 may be determined based on the block idle periods BI_31 to BI_34 for the third open block BLK 3.

The predicted idle period of the memory device may be determined based on the representative idle periods of one or more open blocks. In an embodiment, the predicted idle period may be determined based on any one of the minimum idle period, the intermediate idle period, the average idle period, and the maximum idle period of one or more representative idle periods of the open blocks. For example, the predicted idle period may be the minimum idle period that is a minimum value of the one or more representative idle periods of the open blocks.

For example, the predicted idle period PI of the memory device may be determined based on any one of the minimum idle period, the intermediate idle period, the average idle period, and the maximum idle period of the representative idle periods RI_1, RI_2, RI_3 corresponding to the respective open blocks. For example, the predicted idle period PI may be the minimum idle period that is the minimum value of the representative idle periods RI_1, RI_2, and RI_3.

Figure 9:
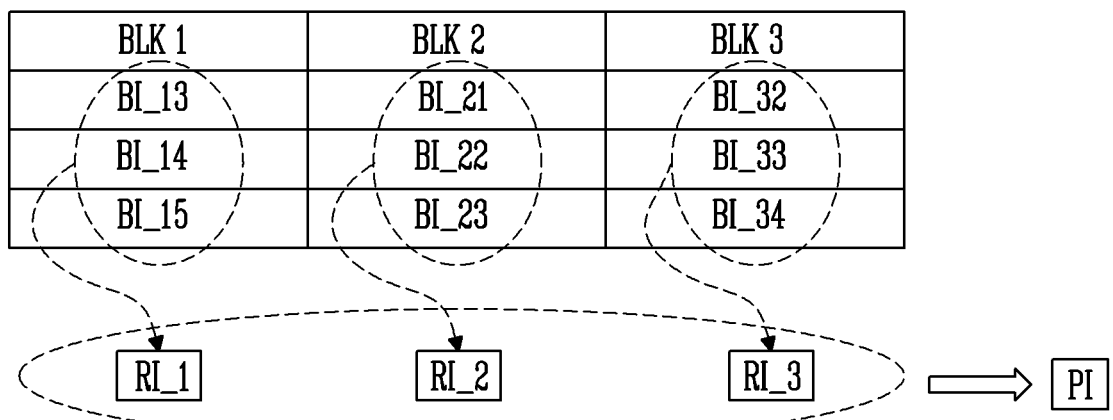
FIG. 9 is a diagram illustrating the idle period storage of FIG. 7 according to an embodiment of the present disclosure.

FIG. 9 is a diagram illustrating the idle period storage of FIG. 7 according to an embodiment.

Referring to FIG. 9, in comparison with FIG. 8, the idle period storage 211 may store, for each open block, information of a set number of block idle periods including a recent block idle period. In FIG. 9, the set number may be 3. The set number is not limited to the present embodiment.

For example, the idle period storage 211 may store information of three block idle periods BI_13 to BI_15 including the recent block idle period BI_15 among the block idle periods BI_11 to BI_15 for the first open block BLK 1. The idle period storage 211 may store information of three block idle periods BI_21 to BI_23 including the recent block idle period BI_23 among the block idle periods BI_21 to BI_23 for the second open block BLK 2. The idle period storage 211 may store information of three block idle periods BI_32 to BI_34 including the recent block idle period BI_34 among the block idle periods BI_31 to BI_34 for the third open block BLK 3.

A representative idle period of each open block may be determined based on a set number of block idle periods for the corresponding open block. In an embodiment, the representative idle period of an open block may be determined based on any one of the minimum idle period, the intermediate idle period, the average idle period, and the maximum idle period of a set number of block idle periods of the open block. In an embodiment, the representative idle period of an open block may be determined based on one or more block idle periods of the open block in which different weights are reflected depending on the sequence of the block idle periods of the open block. As a block idle period is a more recent block idle period, a higher weight may be reflected.

As described above with reference to FIG. 8, the predicted idle period of the memory device may be determined based on the representative idle periods of one or more open blocks.

In accordance with the embodiment of FIG. 9, the idle period storage 211 may efficiently use a storage space by storing, for each open block, information of a set number of block idle periods including a recent block idle period. Also, the idle period storage 211 may more accurately predict the idle period of the memory device 100 at a current time point by storing the most recent block idle period other than a previous block idle period.

Figure 10:
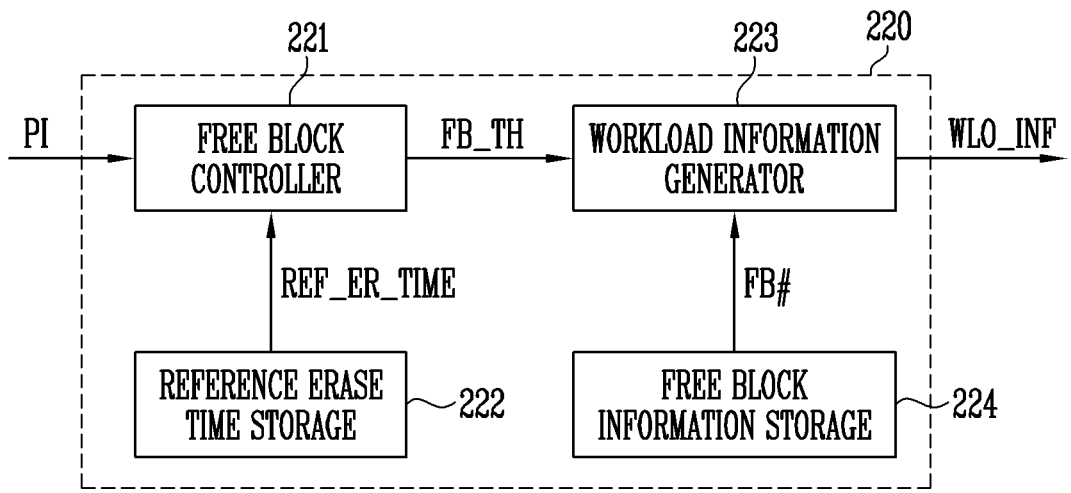
FIG. 10 is a diagram illustrating a workload determiner of FIG. 6 according to an embodiment of the present disclosure.

FIG. 10 is a diagram illustrating the workload determiner of FIG. 6 according to an embodiment of the present disclosure.

Referring to FIG. 10, the workload determiner 220 may include a free block controller 221, a reference erase time storage 222, a workload information generator 223, and a free block information storage 224.

The free block controller 221 may set the threshold number of free blocks FB_TH based on the result of a comparison between a predicted idle period PI and a reference erase time REF_EF_TIME, and the minimum number of free blocks. The minimum number of free blocks may be the number of free blocks at which the memory device 100 is expected to enter a dirty state in which a garbage collection operation is required.

The threshold number of free blocks FB_TH may be for determining whether the number of free blocks falls within a normal range. In an embodiment, the free blocks may be free blocks included in the buffer area 151.

The free block controller 221 may set the threshold number of free blocks FB_TH based on the result of the comparison between the predicted idle period PI and the reference erase time REF_EF_TIME. A lowest value of the threshold number of free blocks FB_TH to be set may be limited to the minimum number of free blocks. In an embodiment, a method of adjusting the threshold number of free blocks FB_TH based on the result of the comparison between the predicted idle period PI and the reference erase time REF_EF_TIME may be variously set.

For example, when the predicted idle period PI is equal to or longer than the reference erase time REF_EF_TIME, the free block controller 221 may maintain or decrease the threshold number of free blocks FB_TH.

In various examples, when the predicted idle period PI is longer than the reference erase time REF_EF_TIME, but the difference therebetween is less than or equal to a reference value, the free block controller 221 may maintain the threshold number of free blocks FB_TH at a previous value. When the predicted idle period PI is longer than the reference erase time REF_EF_TIME and the difference therebetween is greater than the reference value, the free block controller 221 may decrease the threshold number of free blocks FB_TH from the previous value.

For example, when the predicted idle period PI is shorter than the reference erase time REF_EF_TIME, the free block controller 221 may increase the threshold number of free blocks FB_TH from a previous value.

In an embodiment, when the predicted idle period PI is input, the free block controller 221 may adjust the threshold number of free blocks FB_TH. The predicted idle period PI may be calculated whenever an open block is closed. Alternatively, the predicted idle period PI may be calculated at regular cycles. A time point at which the predicted idle period PI is calculated is not limited to the present embodiment.

The reference erase time storage 222 may store information of the reference erase time REF_EF_TIME which is the time required to erase a set number of free blocks. The set number may be variously set depending on a free block management policy. In an embodiment, the set number may be 1.

The workload information generator 223 may generate workload information WLO_INF indicating the workload pattern of the memory device based on the result of the comparison between the number of free blocks FB # and the threshold number of free blocks FB_TH.

For example, when the number of free blocks FB # is equal to or greater than the threshold number of free blocks FB_TH, the number of free blocks FB # may fall within a normal range, and the workload pattern may be a first workload pattern. When the number of free blocks FB # is less than the threshold number of free blocks FB_TH, the number of free blocks FB # may fall out of the normal range, and the workload pattern may be a second workload pattern.

The free block information storage 224 may store free block information indicating the number of free blocks FB #. The free block information storage 224 may provide the free block information to the workload information generator 223. As described above with reference to FIG. 4, the free block information may be updated whenever a free block is assigned as a data block or whenever a free block becomes an open block. In an embodiment, the number of free blocks FB # may be the number of free blocks in the buffer area 151.

Figure 11:
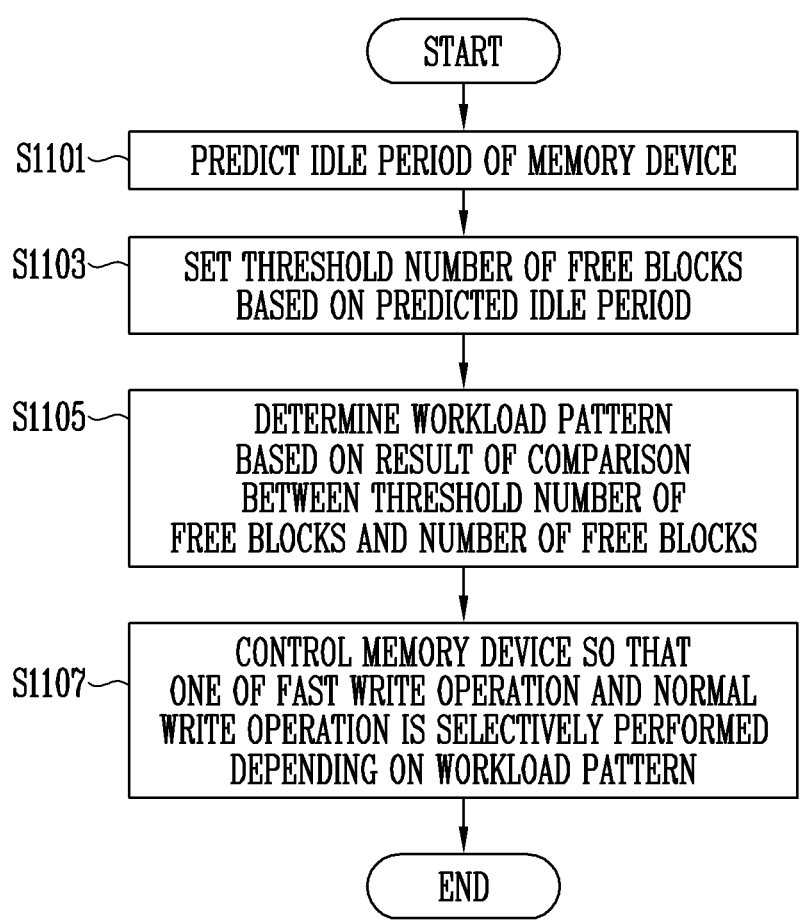
FIG. 11 is a flowchart illustrating the operation of a memory controller according to an embodiment of the present disclosure.

FIG. 11 is a flowchart illustrating the operation of a memory controller according to an embodiment of the present disclosure.

Referring to FIG. 11, at operation S1101, the memory controller may predict an idle period of a memory device. As described above with reference to FIGS. 8 and 9, the memory controller may predict the idle period of the memory device based on one or more block idle periods for each open block.

At operation S1103, the memory controller may set the threshold number of free blocks based on the predicted idle period. The memory controller may set the threshold number of free blocks based on the result of a comparison between the predicted idle period and a reference erase time, and the minimum number of free blocks.

At operation S1105, the memory controller may determine a workload pattern based on the result of a comparison between the threshold number of free blocks and the number of free blocks included in the memory device. Here, the free blocks may be the free blocks among the buffer blocks within the buffer area 151 illustrated in FIG. 1.

At operation S1107, the memory controller may control the memory device so that one of a fast write operation and a normal write operation is selectively performed depending on the workload pattern.

In an embodiment, the fast write operation may be an operation of storing data in the buffer blocks included in the buffer area 151 of FIG. 1. The normal write operation may be an operation of storing data in the main blocks included in the main area 152 of FIG. 1.

Figure 12:
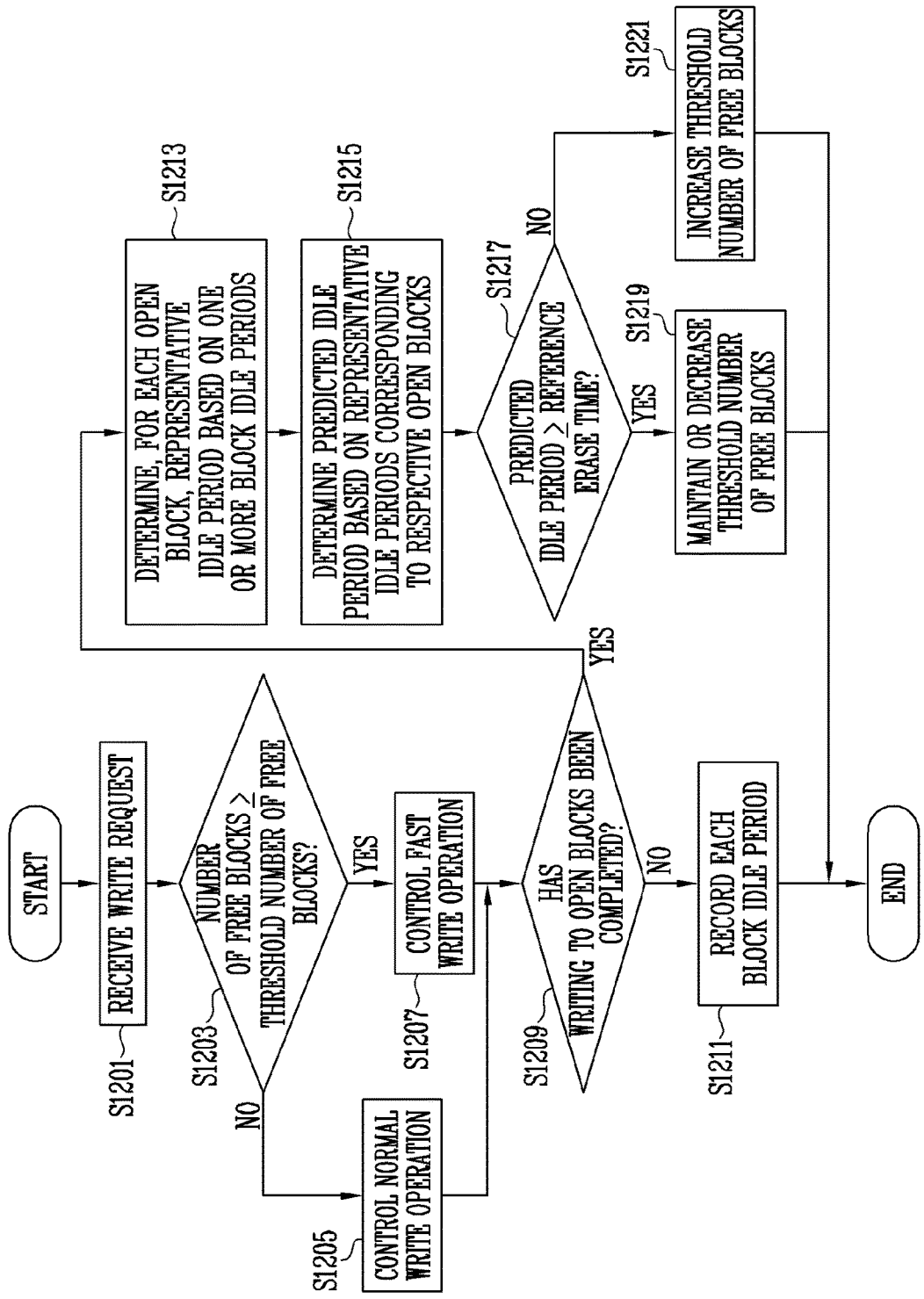
FIG. 12 is a flowchart illustrating in detail the operation of a memory controller according to an embodiment of the present disclosure.

FIG. 12 is a flowchart illustrating in detail the operation of a memory controller according to an embodiment of the present disclosure.

Referring to FIG. 12, at operation S1201, the memory controller may receive a write request from a host.

At operation S1203, the memory controller may determine whether the number of free blocks is equal to or greater than the threshold number of free blocks. When it is determined that the number of free blocks is equal to or greater than the threshold number of free blocks (Yes at S1203), the process proceeds to operation S1207, whereas when it is determined that the number of free blocks is less than the threshold number of free blocks (No at S1203), the process proceeds to operation S1205.

At operation S1205, the memory controller may control the memory device so that a normal write operation is performed. The normal write operation may be an operation of storing data in the main area 152.

At operation S1207, the memory controller may control the memory device so that a fast write operation is performed. The fast write operation may be an operation of storing data in the buffer area 151.

At operation S1209, the memory controller may determine whether writing to an open block has been completed. In other words, it may be determined whether any of the open blocks becomes a closed block.

When it is determined that writing to the open block has been completed (Yes at S1209), the process proceeds to operation S1213, whereas when it is determined that writing to the open block has not been completed (No at S1209), the process proceeds to operation S1211.

At operation S1211, the memory controller may record each block idle period for the corresponding open block. The block idle period may be a time interval from the completion of the write operation at operation S1205 or S1207 to a time point before a next write operation is performed. In an embodiment, the memory controller may autonomously measure the block idle period. In an embodiment, the memory controller may acquire each block idle period from the host. Since the write operation is performed in response to the write request from the host, the host may determine the block idle period.

At operation S1213, the memory controller may determine, for each open block, a representative idle period based on one or more block idle periods.

At operation S1215, the memory controller may determine a predicted idle period based on representative idle periods corresponding to respective open blocks.

At operation S1217, the memory controller may determine whether the predicted idle period is equal to or longer than a reference erase time. When it is determined that the predicted idle period is equal to or longer than the reference erase time (Yes at S1217), the process proceeds to operation S1219. When it is determined that the predicted idle period is shorter than the reference erase time (No at S1217), the process proceeds to operation S1221. The reference erase time may be the time required to erase a set number of free blocks included in the buffer area 151.

At operation S1219, the memory controller may maintain or decrease the threshold number of free blocks. The threshold number of free blocks may be for determining whether the number of free blocks among a plurality of memory blocks included in the memory device falls within a normal range. In an embodiment, the number of free blocks may be the number of free blocks included in the buffer area 151.

At operation S1221, the memory controller may increase the threshold number of free blocks.

Figure 13:
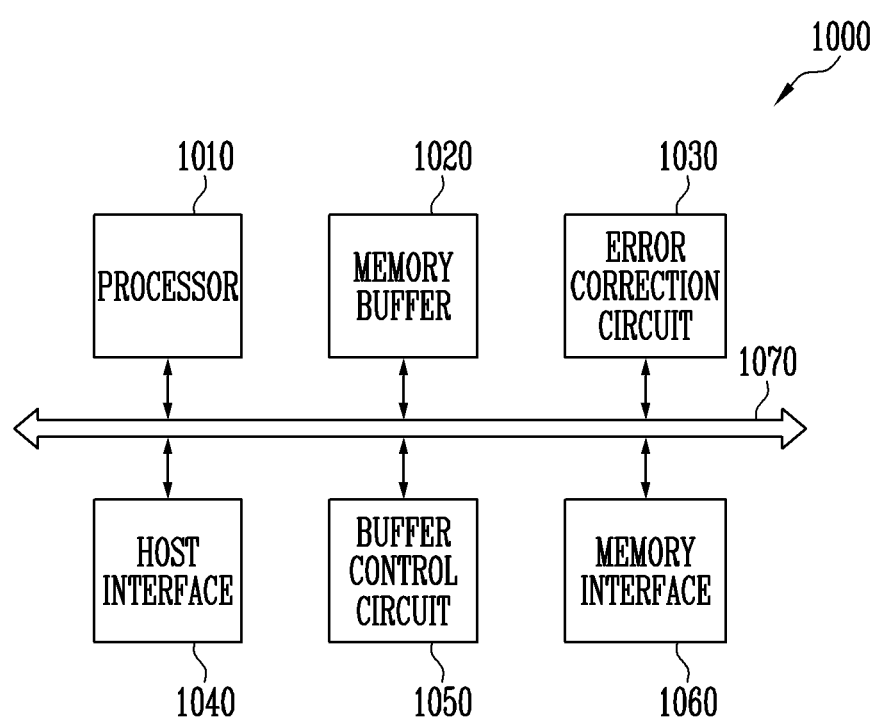
FIG. 13 is a diagram illustrating the memory controller of FIG. 1 according to an embodiment of the present disclosure.

FIG. 13 is a diagram illustrating the memory controller of FIG. 1 according to an embodiment of the present invention.

Referring to FIG. 13, a memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

The memory controller 1000 may include a processor 1010, a memory buffer 1020, an error correction circuit (ECC) 1030, a host interface 1040, a buffer control circuit 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory, or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor 1010 may derandomize data received from the memory device during a read operation. For example, the processor 1010 may derandomize the data received from the memory device using a derandomizing seed. The derandomized data may be output to the host.

In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The error correction circuit 1030 may perform error correction. The error correction circuit 1030 may perform error correction code (ECC) encoding based on data to be written to the memory device through the memory interface 1060. The ECC-encoded data may be transferred to the memory device through the memory interface 1060. The error correction circuit 1030 may perform ECC decoding based on data received from the memory device through the memory interface 1060. In an example, the error correction circuit 1030 may be included as the component of the memory interface 1060 in the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, and may neither interfere with each other nor influence each other. The data bus may be coupled to the host interface 1040, the buffer control circuit 1050, the error correction circuit 1030, and the memory interface 1060. The control bus may be coupled to the host interface 1040, the processor 1010, the buffer control circuit 1050, the memory buffer 1020, and the memory interface 1060.

In an embodiment, the processor 1010 may include an idle determiner 210, a workload determiner 220, and a write controller 230 illustrated in FIG. 1.

Figure 14:
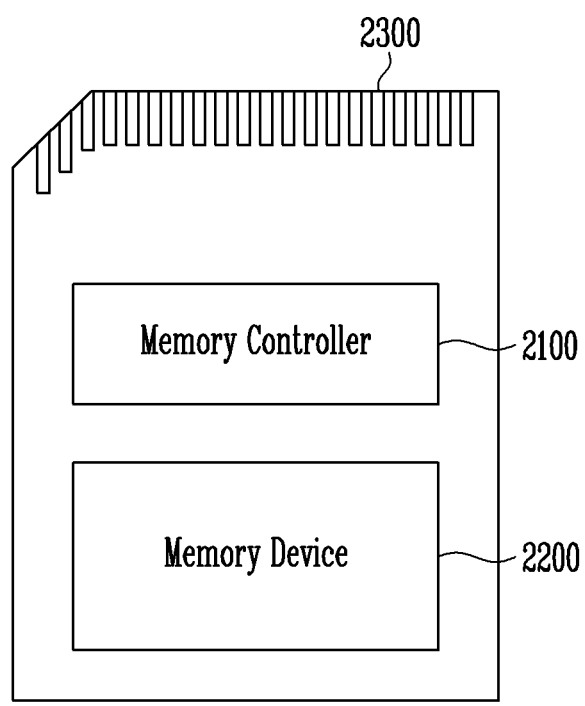
FIG. 14 is a block diagram illustrating a memory card system to which a storage device according to an embodiment of the present disclosure is applied.

FIG. 14 is a block diagram illustrating a memory card system to which a storage device according to an embodiment of the present disclosure is applied.

Referring to FIG. 14, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same way as the memory controller 200 described above with reference to FIG. 1.

In an embodiment, the memory controller 2100 may include components, such as a RAM, a processor, a host interface, a memory interface, and an error correction circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (Re-RAM), a Ferroelectric RAM (FRAM), a Spin-Torque Magnetic RAM (STT-M RAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 15:
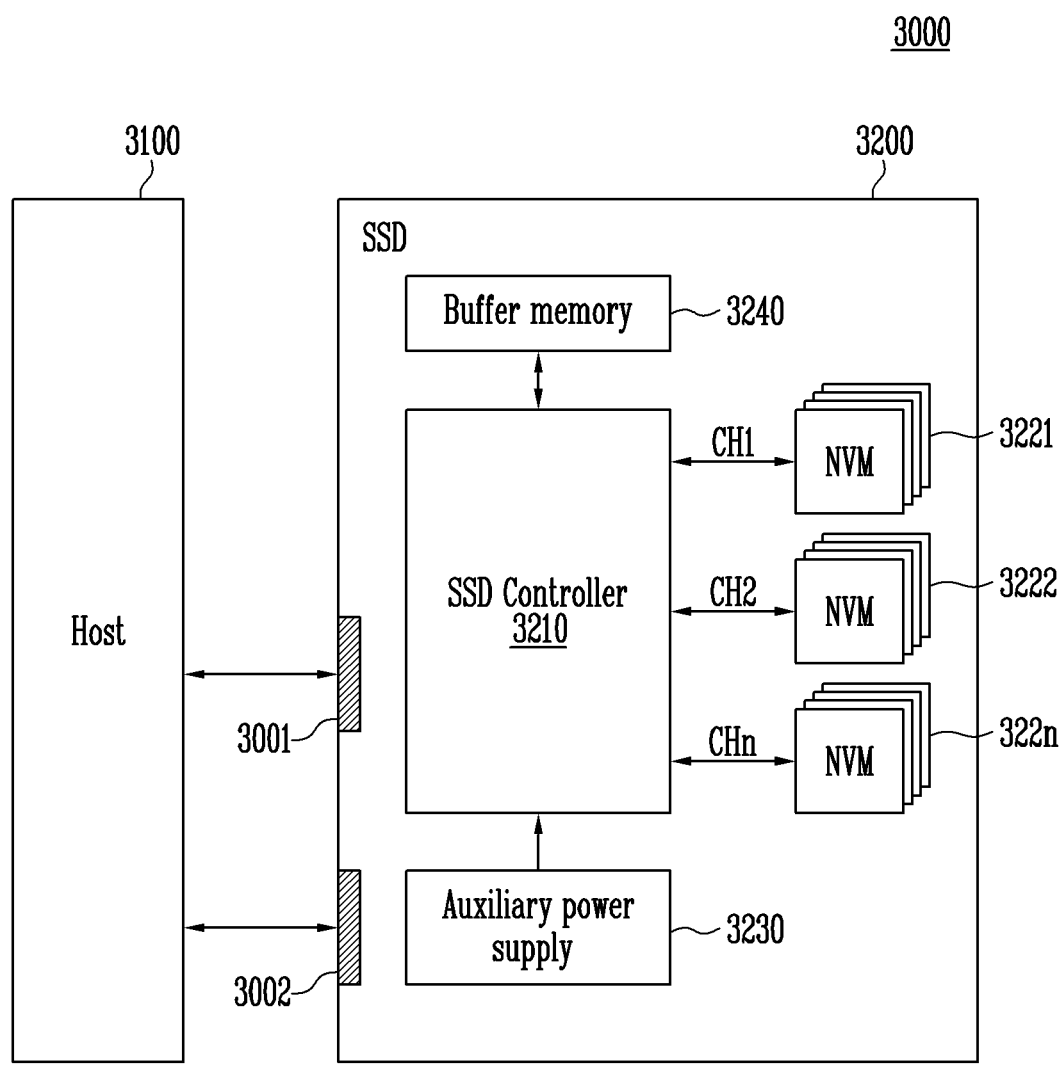
FIG. 15 is a block diagram illustrating a solid state drive (SSD) system to which a storage device according to an embodiment of the present disclosure is applied.

FIG. 15 is a block diagram illustrating a solid state drive (SSD) system to which a storage device according to an embodiment of the present disclosure is applied.

Referring to FIG. 15, an SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In accordance with an embodiment of the present disclosure, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 16:
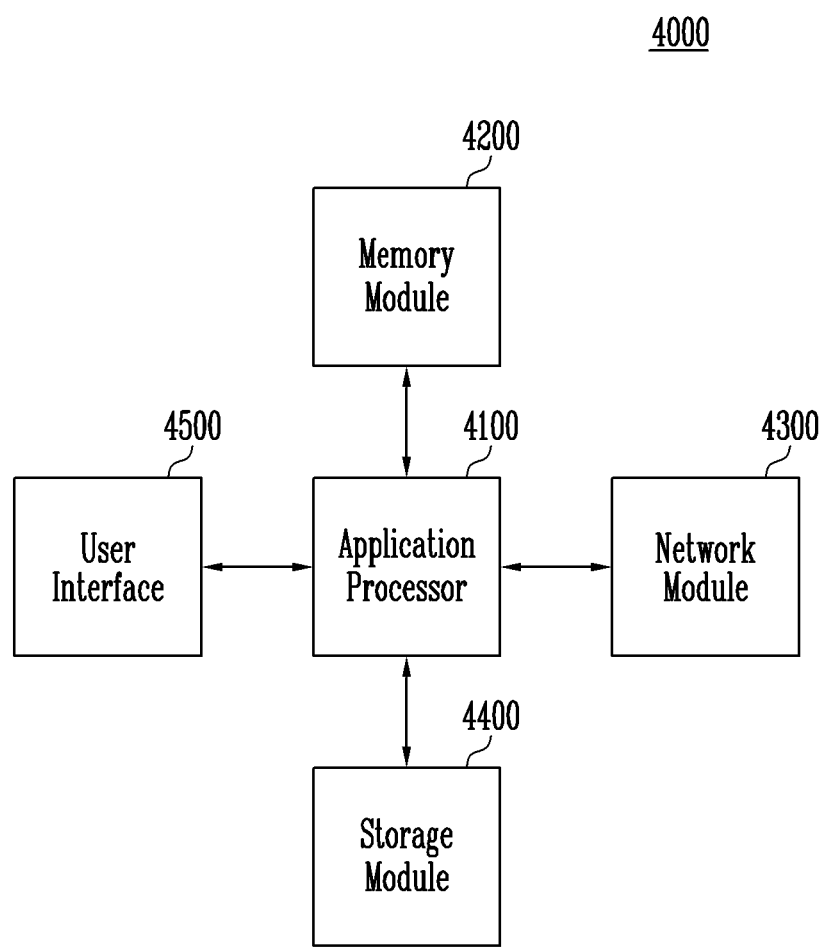
FIG. 16 is a block diagram illustrating a user system to which a storage device according to an embodiment of the present disclosure is applied.

FIG. 16 is a block diagram illustrating a user system to which a storage device according to an embodiment of the present disclosure is applied.

Referring to FIG. 16, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same way as the memory device 100 described above with reference to FIG. 1. The storage module 4400 may be operated in the same way as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there are provided a memory controller having improved write performance and a method of operating the memory controller.

While the present invention has been described with respect to the specific embodiments, it will be apparent to those skilled in the art that various changes and modifications may be made without departing from the spirit and scope of the invention as defined in the following claims.

What is claimed is:

1. A memory controller for controlling a memory device including a plurality of memory blocks, the memory controller comprising:
   a workload determiner configured to set a threshold number of free blocks for determining whether a number of free blocks among the plurality of memory blocks, falls within a normal range based on a predicted idle period of the memory device, and to determine a workload pattern of the memory device by comparing the number of free blocks with the threshold number of free blocks; and
   a write controller configured to control the memory device so that one of a fast write operation and a normal write operation is selectively performed depending on the workload pattern.

2. The memory controller according to claim 1, further comprising an idle determiner configured to determine the predicted idle period based on representative idle periods corresponding to respective open blocks among the plurality of memory blocks,
   wherein the representative idle periods are determined based on at least one block idle period in which a data write operation is not performed on the respective open blocks.

3. The memory controller according to claim 2, wherein the predicted idle period is determined based on any one of a minimum idle period, an intermediate idle period, an average idle period, and a maximum idle period of the representative idle periods corresponding to the respective open blocks.

4. The memory controller according to claim 2, wherein the idle determiner further comprises an idle period storage configured to store, for each open block, information of one or more block idle periods of the open block during which the data write operation is not performed on the open block after an open time point of the open block.

5. The memory controller according to claim 4, wherein each of the representative idle periods is determined based on any one of a minimum idle period, an intermediate idle period, an average idle period, and a maximum idle period of the one or more block idle periods of a corresponding open block.

6. The memory controller according to claim 4, wherein the idle period storage stores, for each open block, information of a set number of block idle periods of the open block including a recent block idle period of the open block.

7. The memory controller according to claim 6, wherein each of the representative idle periods is determined based on any one of a minimum idle period, an intermediate idle period, an average idle period, and a maximum idle period of the set number of block idle periods of a corresponding open block.

8. The memory controller according to claim 1, wherein the workload determiner comprises:
    a free block controller configured to set the threshold number of free blocks based on a result of a comparison between the predicted idle period and a reference erase time, and a minimum number of free blocks; and
    a workload information generator configured to determine one of a first workload pattern and a second workload pattern as the workload pattern, based on the result of the comparison between the number of free blocks and the threshold number of free blocks.

9. The memory controller according to claim 8, wherein:
    when the number of free blocks is equal to or greater than the threshold number of free blocks, the number of free blocks falls within the normal range, and the workload pattern is the first workload pattern.

10. The memory controller according to claim 8, wherein:
    when the number of free blocks is less than the threshold number of free blocks, the number of free blocks falls out of the normal range, and the workload pattern is the second workload pattern.

11. The memory controller according to claim 8, wherein:
    the plurality of memory blocks comprise buffer blocks and main blocks,
    wherein each of the buffer blocks includes memory cells configured to store n bits, where n is a natural number of 1 or more, and
    wherein each of the main blocks includes memory cells configured to store m bits, where m is a natural number equal to or greater than n.

12. The memory controller according to claim 11, wherein:
    the number of free blocks is a number of free blocks included in the buffer blocks, and
    wherein the minimum number of free blocks is a number of free blocks included in the buffer blocks expected to enter a dirty state in which a garbage collection operation is required.

13. The memory controller according to claim 11, wherein the reference erase time is time required to erase a set number of buffer blocks among the buffer blocks.

14. The memory controller according to claim 11, wherein the write controller is configured to, when the workload pattern is the first workload pattern, control the memory device so that the fast write operation of storing write data in the buffer blocks is performed.

15. The memory controller according to claim 11, wherein the write controller is configured to, when the workload pattern is the second workload pattern, control the memory device so that the normal write operation of storing write data in the main blocks is performed.

16. A method of operating a memory controller for controlling a memory device including a plurality of memory blocks, the method comprising:
    determining a predicted idle period of the memory device based on representative idle periods corresponding to respective open blocks among the plurality of memory blocks;
    setting a threshold number of free blocks based on the predicted idle period; and
    controlling the memory device so that any one of a fast write operation and a normal write operation is selectively performed based on a result of a comparison between the threshold number of free blocks and a number of free blocks among the plurality of memory blocks,
    wherein the representative idle periods are determined based on at least one block idle period in which a data write operation is not performed on the respective open blocks.

17. The method according to claim 16, further comprising determining, for each open block, a representative idle period based on one or more block idle periods of the open block during which the data write operation is not performed on the open block after an open time point of the open block.

18. The method according to claim 17, wherein:
    the plurality of memory blocks comprise buffer blocks and main blocks,
    wherein each of the buffer blocks includes memory cells configured to store n bits, where n is a natural number of 1 or more, and
    wherein each of the main blocks includes memory cells configured to store m bits, where m is a natural number equal to or greater than n.

19. The method according to claim 18, wherein:
    the setting of the threshold number of free blocks includes determining the threshold number of free blocks based on a result of a comparison between the predicted idle period and a reference erase time, and
    wherein the reference erase time is time required to erase a set number of buffer blocks among the buffer blocks.

20. The method according to claim 18, wherein:
    the controlling of the memory device includes controlling, when the number of free blocks is equal to or greater than the threshold number of free blocks, the memory device so that the fast write operation of storing write data in the buffer blocks is performed, and
    wherein the number of free blocks is a number of free blocks included in the buffer blocks.

\* \* \* \* \*